United States Patent [19]

Ross

[11] Patent Number: 4,827,498
[45] Date of Patent: May 2, 1989

[54] TELEPHONE LINE AND INSTRUMENT TESTER

[76] Inventor: James W. Ross, 139 Orchard St., New Bedford, Mass. 02740

[21] Appl. No.: 642,187

[22] Filed: Aug. 17, 1984

[51] Int. Cl.⁴ .............................................. H04M 1/24
[52] U.S. Cl. ...................................... 379/27; 379/26; 379/29; 379/32
[58] Field of Search .................. 179/175.3 R, 175.3 F, 179/175, 178, 179, 175.1 R, 81 C; 324/133; 379/22, 27, 29, 26, 32

[56] References Cited

U.S. PATENT DOCUMENTS

| | | | |
|---|---|---|---|
| 2,956,229 | 10/1960 | Henel | 179/175 |
| 3,976,849 | 8/1976 | Champan | 179/175.3 R X |
| 4,373,120 | 2/1983 | McDonald | 179/175 |

Primary Examiner—Stafford D. Schreyer
Attorney, Agent, or Firm—Salter & Michaelson

[57] ABSTRACT

A telephone line and instrument tester is disclosed which is operable by a consumer for determining whether a malfunction in a telephone system is caused by a malfunction in a telephone instrument of the system or by a malfunction in source related equipment of the system, such as a telephone line leading to a jack of the system. The tester is receivable in a modular telephone jack for testing the operation of source related equipment of the system and a modular plug of a telephone cord is receivable in the tester for testing the operation of a telephone instrument attached to the cord. A circuit in the tester is responsive to the flow of current therethrough for providing an indication of the operation of the source related equipment and/or the telephone instrument.

3 Claims, 1 Drawing Sheet

U.S. Patent   May 2, 1989   4,827,498
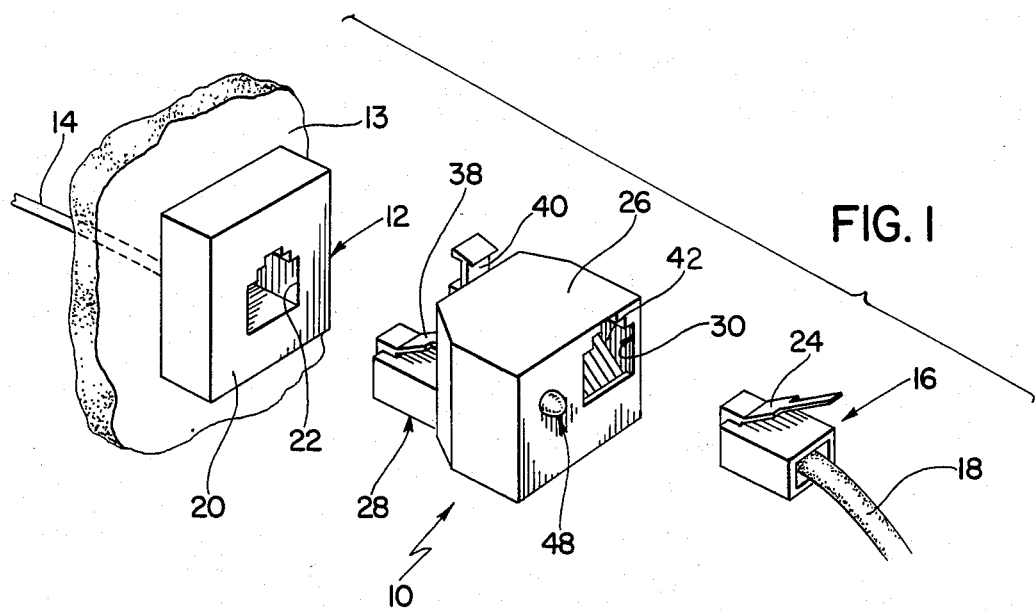
FIG. 1
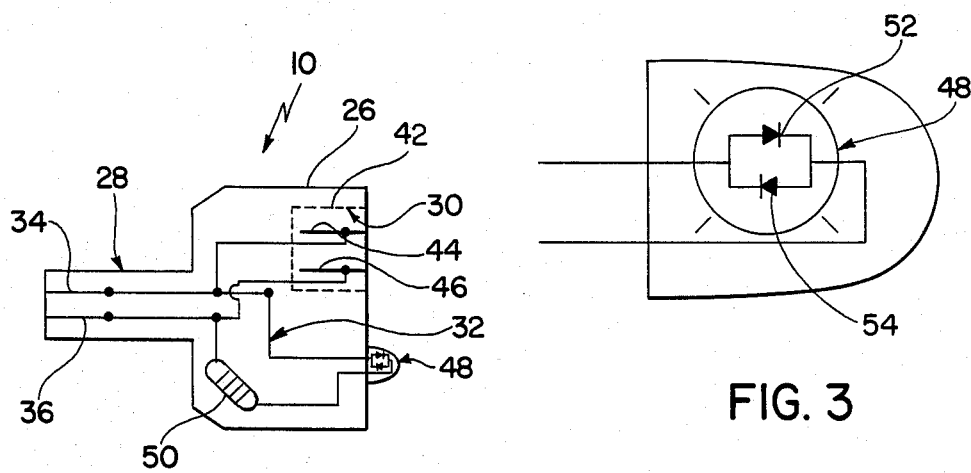
FIG. 2
FIG. 3

TELEPHONE LINE AND INSTRUMENT TESTER

BACKGROUND AND SUMMARY OF THE INVENTION

The instant invention relates to telephone equipment and more particularly to a tester which is operable by a consumer for testing the operation of telephones and/or source related equipment such as telephone lines.

As a result of recent organizational changes in the companies which operate most domestic telephone systems, it has become important for consumers to have some means of making initial diagnoses of malfunctions in telephone systems before contacting telephone repair services. Specifically, it has become important for an average consumer to be able to determine whether a malfunction in a telephone system results from a problem in source related equipment, such as a telephone line, or from a problem in a telephone instrument connected to the line. After an initial diagnosis of this type has been made, the consumer can then contact an appropriate repair service and unnecessary repair service charges for equipment which is in proper operating condition can be avoided. In any event, because of this newly developed need for consumers to be able to initially diagnose problems in telephone systems, a need has arisen for a simple testing device which can be easily operated by consumers for performing diagnoses of this type in telephone systems, and it is for this reason that the device of the instant invention has been developed.

Devices representing the closest prior art to the instant invention of which the applicant is aware are disclosed in the U.S. Pat. Nos. to Henel 2,956,229, Garrett et al. 3,600,678, Berger et al. 4,005,365, Spiteri 4,025,850, Charles et al. 4,209,671, Ahuja 4,369,341, and Turner 4,415,778. However, while these patents disclose a variety of different testing devices, they do not disclose or teach a simple and effective device which can be easily utilized by a consumer to make an initial diagnosis of a problem in a telephone system. Hence, for this reason, as well as for a number of other reasons which will hereinafter be set forth, these references are believed to be of only general interest with respect to the instant invention.

The telephone line and instrument testing device of the instant invention comprises plug means which is receivable in a telephone system jack, circuit means which is electrically connected to the plug means, and jack means which is electrically connected to the plug means in parallel relation to the circuit means. The plug means of the device is preferably of a modular construction so that it is receivable in a conventional modular telephone jack, and it includes first and second terminals which are electrically connectable to first and second terminals of the jack, respectively, to interconnect the plug means to the tip (positive) and ring (negative) lines of a telephone system. The circuit means of the testing device is electrically connected to the first and second terminals of the plug means and it includes first and second unidirectional D.C. current flow indicating means, one of the current flow indicating means being responsive to the flow of D.C. current in the circuit means in one direction between the first and second terminals of the plug means and the other indicating means being responsive to the flow of D.C. current in the circuit means in the opposite direction between the first and second terminals of the plug means. Preferably, the first and second unidirectional D.C. current flow indicating means are embodied as first and second L.E.D.s which are operative for emitting red and green lights, respectively, and which are responsive to opposite D.C. current flows in the circuit means during periods when the voltages in the circuit means are within the ranges of normal on-hook,talking.and ringing voltage levels. When the device is embodied in this manner, both L.E.D.s will alternately light when alternating current is applied as ringing voltage, producing a yellow light. Accordingly, the L.E.D. indicating means permits the device of the instant invention to be utilized for determining whether or not a telephone system line connected thereto is energized and in operative condition and also for determining the polarity of the current in the system. The jack means of the testing device is electrically connected to the plug means in parallel relation with the circuit means and it is preferably embodied in a modular jack construction for receiving a modular plug connected to a telephone instrument cord. This permits the testing device to be easily utilized for testing a telephone instrument cord and/or a telephone instrument itself in a manner which will hereinafter be more fully described.

Accordingly, it is a primary object of the instant invention to provide an effective and simple testing device which can be easily utilized by a consumer for performing an initial diagnosis of a malfunction in a telephone system.

Another object of the instant invention is to provide a telephone line and instrument tester which is operative in response to on-hook,talking.and ringing level telephone system voltages.

A still further object of the instant invention is to provide a simple device for determining whether a telephone system malfunction is caused by a malfunction in a telephone instrument in the system or by a malfunction in a telephone line or other source related equipment in the system.

Other objects, features and advantages of the invention shall become apparent as the description thereof proceeds when considered in connection with the accompanying illustrative drawings.

DESCRIPTION OF THE DRAWING

In the drawing which illustrates the best mode presently contemplated for carrying out the present invention:

FIG. 1 is an exploded perspective view of the device of the instant invention in combination with a telephone jack and a telephone plug;

FIG. 2 is a schematic view of the tester; and

FIG. 3 is a schematic view of the L.E.D. portion of the tester.

DESCRIPTION OF THE INVENTION

Referring now to the drawing, the tester of the instant invention is illustrated and generally indicated at 10 in FIGS. 1 and 2. As illustrated in FIG. 1, the tester 10 is receivable in a modular telephone jack generally indicated at 12 which is mounted on a wall 13 and connected to a telephone service line 14, and a modular telephone plug generally indicated at 16 which is attached to a telephone instrument line 18 is receivable in the tester 10 to interconnect the tester 10 to a telephone instrument through the line 18. By plugging the tester 10 into the jack 12, the tester 10 can be utilized for determining whether D.C. electrical power is being supplied to the jack 12 through the telephone service line 14 and, assuming that the serviceline 14 is operative, when the plug 16 is thereafter plugged into the tester 10, the tester 10 can be utilized for testing the operation of a conventional telephone instrument, such as a conventional dial or touch tone telephone, which is connected to the line 18.

The jack 12 and the plug 16 preferably comprise conventional modular telephone apparatus of the type utilized for most domestic telephone systems. The jack 12 comprises a housing 20 having a socket 22 formed therein for receiving a plug, such as the plug 16. Provided within the socket 22 are first and second jack terminals (not shown) which are electrically connected to the tip (positive) and ring (negative) lines of a telephone system through the line 14. Similarly, the plug 16 includes first and second plug terminals (not shown) which are electrically interconnectable with the first and second jack terminals by inserting the plug 16 into the aperture 22 of the jack 12. A resilient latch 24 which is also of conventional construction is included in the plug 16 for retaining it in an aperture of a jack, such as the aperture 22, the latch 24 being depressable to release the plug 16 from a jack aperture when desired.

The tester 10 comprises a housing 26, a plug unit generally indicated at 28, a jack unit generally indicated at 30, and a circuit which is illustrated in FIG. 2 and generally indicated at 32. The plug unit 28 is formed in a configuration which is similar to that of the plug 16 and it includes first and second terminals 34 and 36 illustrated in FIG. 2, and a latch 38 which is similar to the latch 24 is formed on the extension portion of the plug unit 28. The plug unit 28 is constructed so that it is receivable in an aperture of a jack, such as the aperture 22, with the first and second terminals 34 and 36 of the plug unit 28 electrically connected to the first and second terminals of the jack, respectively, and the latch 38 is operative for releasably retaining the plug unit 28 therein in a manner similar to the latch 24. Also included in the plug unit 28 is a slidable extension 40 which is attached to the housing 26 and which is depressable to engage and resiliently depress the latch 38 to release the plug unit 28 from a jack. The jack unit 30 of the tester 10 is contained within the housing 26 and it comprises a socket 42 which defines an aperture which is dimensioned to receive a modular plug, such as the plug 16. First and second terminals 44 and 46, respectively, are provided in the jack unit 30 and are electrically connectable to corresponding first and second terminals of a plug, such as the plug 16, by inserting the plug into the jack unit 30. The housing 26 is preferably molded of a suitable rigid plastic material and it contains the circuit 32. The plug unit 28 is attached to the housing 26 and it extends from one end thereof, whereas the jack unit 30 preferably communicates with the opposite end of the housing 26.

The circuit 32 comprises a light emitting diode unit 48 and a resistor 50. The diode unit 48 is electrically connected between the first and second terminals 34 and 36, and the resistor 50 is interposed between one of the terminals of the diode unit 48 and the respective terminal of the plug unit 28. In the embodiment of the tester herein set forth, the resistor 50 is interposed between the diode unit 48 and the second terminal 36, whereas the diode unit 48 is directly connected to the first terminal 34. It will be understood, however, that the resistor 50 could alternatively be positioned between the diode unit 48 and the first terminal 34 in other embodiments of the tester. Further, the resistor 50 preferably has a value of approximately 12K ohms although the use of resistors having other values is contemplated. The first and second terminals 44 and 46 of the jack unit 30 are electrically connected to the first and second terminals 34 and 36 of the plug unit 28 in parallel relation with the portion of the circuit 32 which includes the diode unit 48 and the resistor 50, as illustrated in FIG. 2. The diode unit 48 comprises first and second light-emitting diode elements 52 and 54 of different colors, such as red and green, respectively, which are interconnected in parallel relation in the diode unit 48 so that they are alternatively responsive to the flow of D.C. current in opposite directions in the circuit 32 between the first and second terminals 34 and 36 of the plug unit 28. In other words, when the current in the circuit 32 is flowing in one direction between the terminals 34 and 36, the first light emitting diode element 52 is activated to provide a visual indication of the flow of D.C. current in the circuit 32, whereas when the current in the circuit 32 is flowing in the opposite direction between the first and second terminals 34 and 36 of the plug unit 28, the second light emitting diode element 54 provides a visual indication of the flow of current by lighting a different color. When both L.E.D.s alternately conduct during the application of A.C. current which occurs with ringing voltages, a third color will be produced. The light emitting diode unit 48 is positioned in the tester 10 so that it communicates with the exterior thereof through a wall of the housing 26, preferably so that it is easily visible when the plug unit 28 is received in a jack, such as the jack 12.

For use and operation of the tester 10 the plug unit 28 is inserted into the aperture 22 of the jack 12 so that the first and second terminals 34 and 36 of the plug unit 28 are electrically connected to the first and second terminals, respectively, (not shown) of the jack 12 and thereby connected to the tip and ring lines the telephone system line 14. In this manner, the circuit 32 is electrically connected to the tip and ring lines of the system line 14 so that when D.C. current is supplied through the line 14, the current flows through the circuit 32. When the tip and ring lines are connected to the jack 12 so that the flow of current in the circuit 32 is from the first terminal 34 to the second terminal 36, the first L.E.D. element 52 provides a visual indication of the current flow, whereas when the tip and ring lines are connected so that the current flow is from the second terminal 36 back to the first terminal 34, the second L.E.D. element 54 provides a visual indication of the current flow. As a result, the polarity of the current which is received from the jack 12 can be determined simply by observing which one of the L.E.D.s is illuminated and, therefore, it can be determined whether the tip and ring lines of the system line 14 are connected to the proper terminals of the jack 12. On the other hand, if neither of the L.E.D.s 52 or 54 is illuminated when the plug unit 28 is connected to the jack 12, it is apparent that there is a malfunction in the telephone system somewhere between the jack 12 and the system source. Once it has been determined that a proper signal is being supplied to the tester 10 through the jack 12, the operation of a telephone instrument attached to the line 18 can be checked by plugging the plug 24 into the jack unit 30. In this regard, after the plug 24 has been received in the jack unit 30, the operation of a telephone connected to the line 18 can be tested by first positioning the receiver of the telephone instrument on the "hook" portion of the instrument and then removing the receiver from the "hook" portion while observing the L.E.D. unit 48. If the light which is emitted from the L.E.D. unit 48 exhibits a visible dimming when the receiver of the instrument is removed from the "hook" portion thereof, this is an indication that a circuit has been completed through the telephone instrument between the first and second terminals 44 and 46 of the jack unit 30. Accordingly, if a visible dimming of the light emitted from the L.E.D. unit is observed, this is an indication that both the line 18 and the telephone instrument connected thereto are in operative condition, whereas if no visible dimming of the L.E.D. unit 48 is observed under these conditions, it is apparent that either the line 18 or the telephone instrument connected thereto is defective. The tester 10 can also be utilized for testing the cord 18 by removing the tester 10 from the jack 12 and plugging one end of the cord 18 into the jack 12 and the other end of the cord into the jack unit 30 of the tester 10. Under these conditions, if the cord is in proper operating condition, one of the L.E.D. elements 52 or 54 of the L.E.D. unit 48 will provide a visible indication that a signal is being received by the tester 10 through the cord 18.

It is seen, therefore, that the tester of the instant invention can be conveniently and easily utilized by a consumer to provide an initial diagnosis of a malfunction in a telephone system. A consumer can quickly and easily determine whether or not a signal is being received by the tester from a telephone system jack and also whether or not the signal which is received has the proper polarity. Once it has been determined that a signal is being received from a system jack, the tester 10 can be utilized for testing the operation of a telephone instrument line and a telephone instrument connected to the line. The tester 10 can be conveniently plugged into a modular telephone jack and it is constructed to receive a modular telephone plug in the jack unit 30. Further the L.E.D. unit 48 is located so that it is clearly visible at one end of the tester 10 to allow simple tests and initial diagnoses to be easily performed by the consumer. Hence, for these reasons, as well as the other reasons hereinabove set forth, it is seen that the tester of the instant invention represents a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A telephone line and instrument tester comprising modular plug means having first and second terminals, said plug means being receivable in a modular telephone jack, having first and second terminals which are electrically connected to the positive and negative lines of a telephone system, so that said first and second plug means terminals are electrically connected to said first and second jack terminals, respectively, circuit means electrically connected to said first and second plug means terminals and including first and second L.E.D.s which are responsive to on-hook, dial-tone, talking and ringing voltage levels for providing visual indications of the flow of D.C. current therethrough, one of said L.E.D.s being responsive to the flow of D.C. current in one direction in said circuit means between said first and second plug means terminals, the other of said L.E.D.s being responsive to the flow of D.C. current in the opposite direction in said circuit means between said first and second plug means terminals, a modular jack having first and second terminals which are electrically connected to said first and second plug means terminals, respectively, in parallel relation to said first and second L.E.D.s, and a housing, said circuit means being disposed substantially within said housing so that said first and second L.E.D.s are visible from the exterior of said housing, said plug means and said jack means being attached to said housing so that when said plug means is received in a telephone jack, a telephone cord plug is receivable in said jack means.

2. In the tester of claim 1, said first and second L.E.D.s being operative for emitting light of visibly different first and second colors from said tester.

3. In the tester of claim 2, said L.E.D.s being operative in combination for emitting light of a visibly different third color from said tester.

* * * * *